United States Patent
Leiter

(10) Patent No.: US 11,346,321 B2
(45) Date of Patent: May 31, 2022

(54) WINDMILL DESIGN EFFECTIVE AT LOWER WIND SPEEDS

(71) Applicants: Robert Leiter; Ellen Leiter

(72) Inventor: L. David Leiter, Richlandtown, PA (US)

(*) Notice: Subject to any disclaimer, the term of this patent is extended or adjusted under 35 U.S.C. 154(b) by 0 days.

(21) Appl. No.: 17/530,774

(22) Filed: Nov. 19, 2021

(65) Prior Publication Data
US 2022/0074385 A1  Mar. 10, 2022

(51) Int. Cl.
*F03D 3/06* (2006.01)
*F03D 3/00* (2006.01)

(52) U.S. Cl.
CPC ............ *F03D 3/067* (2013.01); *F03D 3/005* (2013.01); *F05B 2260/72* (2013.01)

(58) Field of Classification Search
CPC ......... F03D 3/067; F03D 3/005; F03D 3/064; F03D 3/061; F03D 7/041; F05B 2260/72
See application file for complete search history.

(56) References Cited

U.S. PATENT DOCUMENTS

| | | | | |
|---|---|---|---|---|
| 113,586 A * | 4/1871 | Sinclair | | 416/117 |
| 132,438 A * | 10/1872 | Champlin | | 416/119 |
| 234,617 A * | 11/1880 | Sander | | F03D 3/00 416/118 |
| 4,191,507 A * | 3/1980 | De | | F03D 3/067 416/240 |
| 4,299,537 A * | 11/1981 | Evans | | F03D 3/068 416/119 |
| 5,823,749 A * | 10/1998 | Green | | F03D 3/067 415/2.1 |
| 9,051,916 B2 * | 6/2015 | King | | F03D 3/005 |
| 2011/0163551 A1 * | 7/2011 | King | | F03D 3/005 290/55 |

* cited by examiner

*Primary Examiner* — Eldon T Brockman
(74) *Attorney, Agent, or Firm* — DLA Piper LLP (US)

(57) ABSTRACT

This disclosure provides a vertical-axis windmill including a rotating vertical shaft and at least one vane assembly mounted to the rotating vertical shaft. The vertical-axis windmill rotates around a vertical axis when wind impinges upon the vane assembly. During rotation, a planar sail of the vane assembly moves along an oscillatory arc of about 90°, with the planar sail assuming each of a vertical orientation and a horizontal orientation once during each 360° rotation of the vertical shaft. As described below, this configuration advantageously allows the windmill to be self-starting and suited for operation at low wind-speed.

18 Claims, 3 Drawing Sheets

WINDMILL DESIGN EFFECTIVE AT LOWER WIND SPEEDS

TECHNICAL FIELD

This disclosure relates to vertical-axis windmills. The vertical-axis windmills are advantageously self-starting and suited for operation at low wind-speed.

BACKGROUND

Wind power is a sustainable and low-carbon source of energy. Windmills have been used for many years to capture and convert wind power into useable forms of energy. However, many existing windmill designs have drawbacks in terms of cost, efficiency and noise. Accordingly, there is a need for windmills that are low cost, quiet, self-starting and suited for operation even at low wind-speeds.

SUMMARY

A vertical-axis windmill is provided comprising a rotating vertical shaft rotatable around a vertical axis in a direction of rotation; and at least one vane assembly mounted to the rotating vertical shaft. Each vane assembly comprises a radial spar extending radially from the rotating vertical shaft, a planar sail having a leading edge affixed to the radial spar and a trailing edge opposing the leading edge, a resilient restraining arm extending radially from the rotating vertical shaft; and at least one restraining line connecting the trailing edge of the planar sail to a distal end of the resilient restraining arm. The planar sail is configured to oscillate between a vertical orientation in which the trailing edge of the planar sail is positioned substantially below the radial spar and a horizontal orientation in which the trailing edge of the planar sail trails behind the radial spar in the direction of rotation.

DETAILED DESCRIPTION

This disclosure provides a vertical-axis windmill comprising a rotating vertical shaft and at least one vane assembly mounted to the rotating vertical shaft. The vertical-axis windmill rotates around a vertical axis when wind impinges upon the vane assembly. During rotation, a planar sail of the vane assembly moves along an oscillatory arc of about 90°, with the planar sail assuming each of a vertical orientation and a horizontal orientation once during each 360° rotation of the vertical shaft. As described below, this configuration advantageously allows the windmill to be self-starting and suited for operation at low wind-speed.

Figure 1:
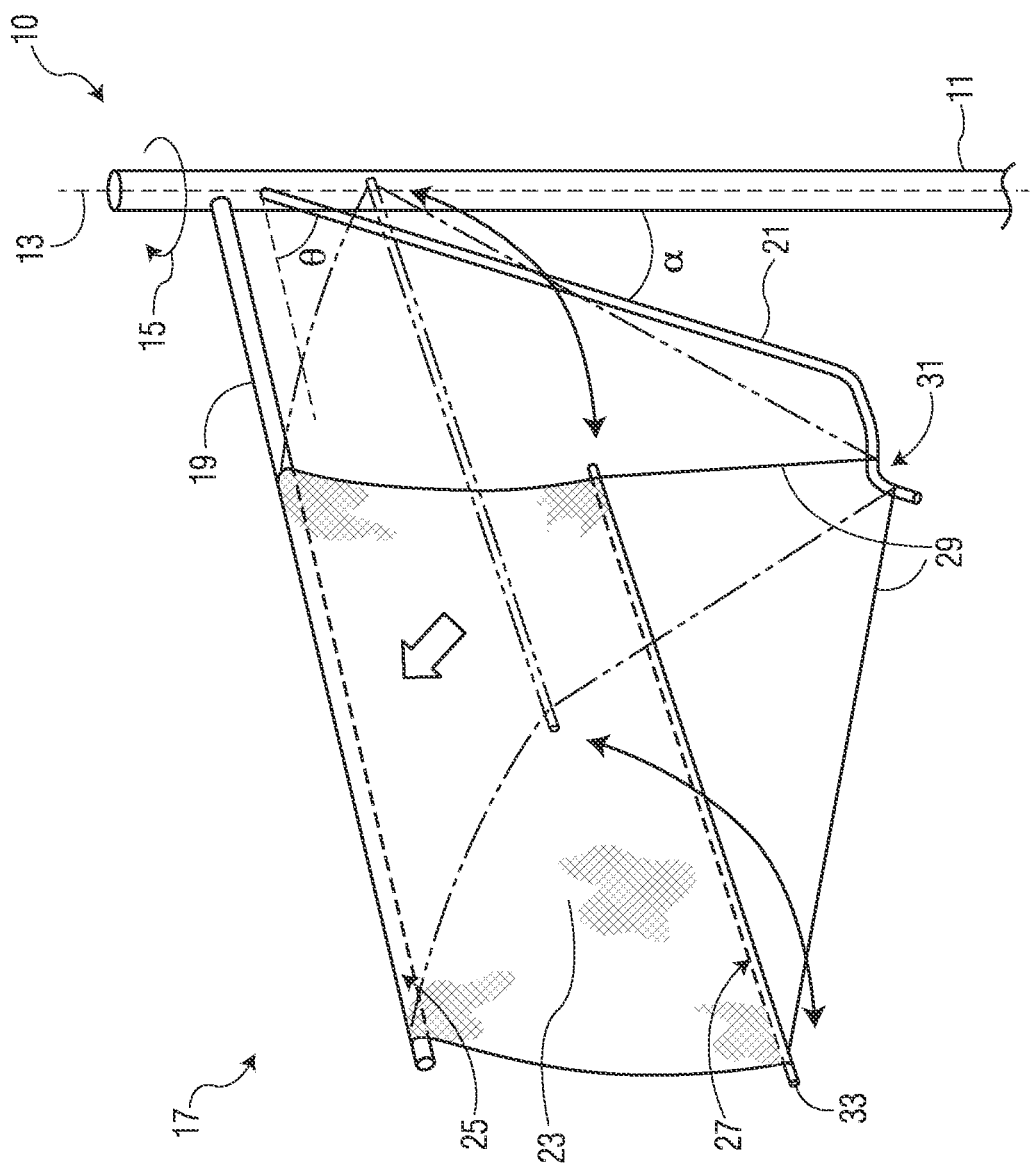
FIG. 1 shows an exemplary vertical-axis windmill with the single vane assembly.

The vertical-axis windmill of this disclosure will now be described with reference to the example depicted in the figures. Referring to FIG. 1, the vertical-axis windmill 10 includes a rotating vertical shaft 11 that is rotatable around a vertical axis 13 in a direction of rotation 15 and at least one vane assembly 17 mounted to the rotating vertical shaft 11. The vertical-axis windmill 10 may be operationally connected to a generator (not shown) or other suitable device capable of converting the rotational movement of vertical-axis windmill 10 into usable energy. In such a manner, the vertical-axis windmill may be used in a method of generating wind-power.

As shown in FIG. 1, each vane assembly 17 may comprise a radial spar 19 extending radially from the rotating vertical shaft 11, a resilient restraining arm 21 extending radially from the rotating vertical shaft 11 and a planar sail 23 affixed to the radial spar 19. The planar sail 23 has a leading edge 25 affixed to the radial spar 19 and a trailing edge 27 opposing the leading edge 25. At least one restraining line 29 connects the trailing edge 27 of the planar sail 23 to a distal end 31 of the resilient restraining arm 21.

As shown in FIG. 1, the radial spar 19 extends radially from the rotating vertical shaft 11 in a direction substantially perpendicular to the rotating vertical shaft 11. The resilient restraining arm 21 generally extends from the vertical shaft 11 at an acute angle $\Theta$ relative to the radial spar 19 such that the resilient restraining arm 21 is positioned behind the radial spar 19 relative to the direction of rotation 15. Additionally, in some aspects, the resilient restraining arm 21 may extend from the vertical shaft 11 at an angle $\alpha$ relative to the vertical shaft 11 such that the resilient restraining arm 21 extends generally downward.

As shown, the planar sail 23 is fixed to the rigid radial spar 19 along the leading edge 25, such as by passing the radial spar 19 through a hem of the planar sail 23. When planar sail 23 assumes the horizontal orientation during rotation, the leading edge 25 of the planar sail 23 advances into the direction of rotation while the trailing edge 27 follows behind. When the planar sail 23 is in the vertical orientation, the leading edge 25 of the planar sail 23 forms an upper edge of the planar sail 23 with the trailing edge 27 positioned below.

The oscillation of the planar sail 23 about the radial spar 19 is preferably accomplished by near-zero force-flexure about the longitudinal axis of the radial spar 19. To achieve such force-flexure, the planar sail 23 may be constructed of a fabric, such as a woven or non-woven fabric.

Additionally, a planar sail 23 may also be made of a different material than woven fabric that is attached to the radial spar with a fabric flexure. In addition to fabric, suitable materials for a planar sail include sheet metal, plastic, structural fiberglass and the like.

The planar sail 23 is suitably rectilinear or, more preferably, rectangular for ease of construction and maximum surface area, although other configurations are possible. Preferably, the planar sail 23 comprises a light-weight stiffening rib 33 affixed to the trailing edge 27 of the planar sail 23. For example, the stiffening rib 33 may be enclosed in a hem along trailing edge 27 of the planar sail 23. The stiffening rib helps to stabilize the trailing edge of the planar sails and reduces degradation of the trailing edge of the fabric often seen in flags due to repeated flapping in the wind.

The planar sail 23 is shown with two restraining lines 29 or ropes connecting the trailing edge 27 of the planar sail 23 to Point A at a distal end 31 of the resilient restraining arm 21. Preferably, at least two restraining lines 29 are provided each respectively connecting an opposing end or corner of the trailing edge 27 of the planar sail 23 to a distal end 31 of the resilient restraining arm 21. Preferably, the restraining arm 21 and restraining line(s) 29 have resilient properties that enable the structures to absorb the force of the planar sail 23 snapping into the vertical orientation and reduce associated noise.

An important feature of the vane assembly 17 is that the restraining arm 21 should be positioned so that it does not obstruct the oscillatory rotation of the planar sail 23 between the horizontal and vertical orientation. In other words, the edge of the planar sail 23 closer to the vertical shaft 11, especially the inward tip of stiffening rib 33, must clear the restraining arm 21 at Point B during oscillation. Considerations for achieving clearance of the planar sail 23 may include the size and shape of the planar sail 23 and positioning the planar sail 23 on the radial spar 19 to be spaced away from vertical shaft 11.

In some aspects of this disclosure, the vertical-axis windmill 10 includes a plurality of vane assemblies 17. In preferred examples, the vertical windmill 10 includes two, three or four vane assemblies 17. Preferably, when provided with four vane assemblies 17, the vane assemblies 17 are arranged in two-diametrically opposed pairs, with each of these two pairs occupying a discrete, unshared, vertical position (plane) of the rotating vertical shaft. By virtue of having a vane assembly with two-diametrically opposed pairs, a four-paned windmill will have one vane that is not blocked by a trailing vane for every 90° of rotation and can be reliably self-starting. This provides for a significantly higher minimum starting torque, higher operating torque and smoother operation than either of a three or two vane design. Additionally, a four-paned windmill will require less cantilever length and operating volume than a three-paned windmill.

Figure 2:
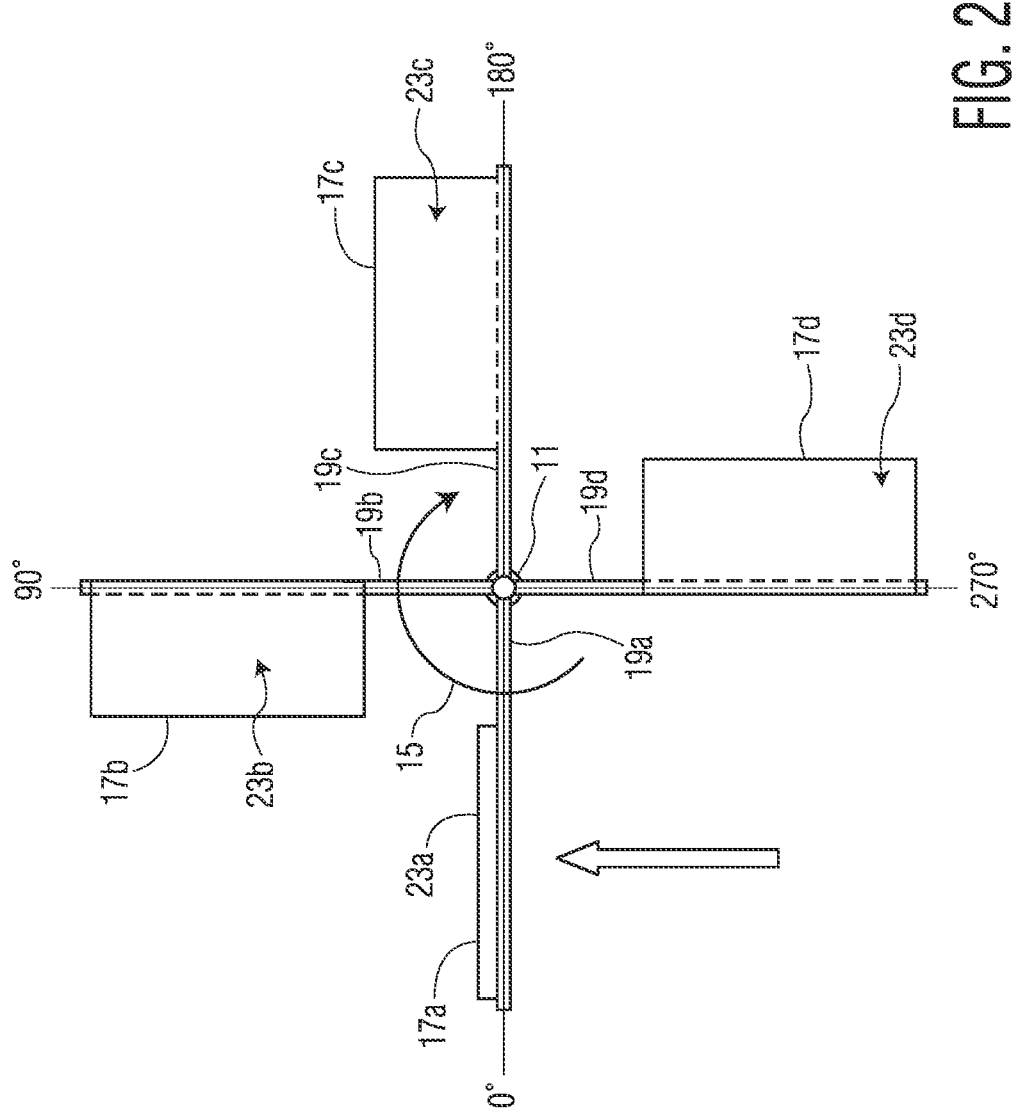
FIG. 2 shows a plan view of an exemplary vertical-axis windmill.
Figure 3:
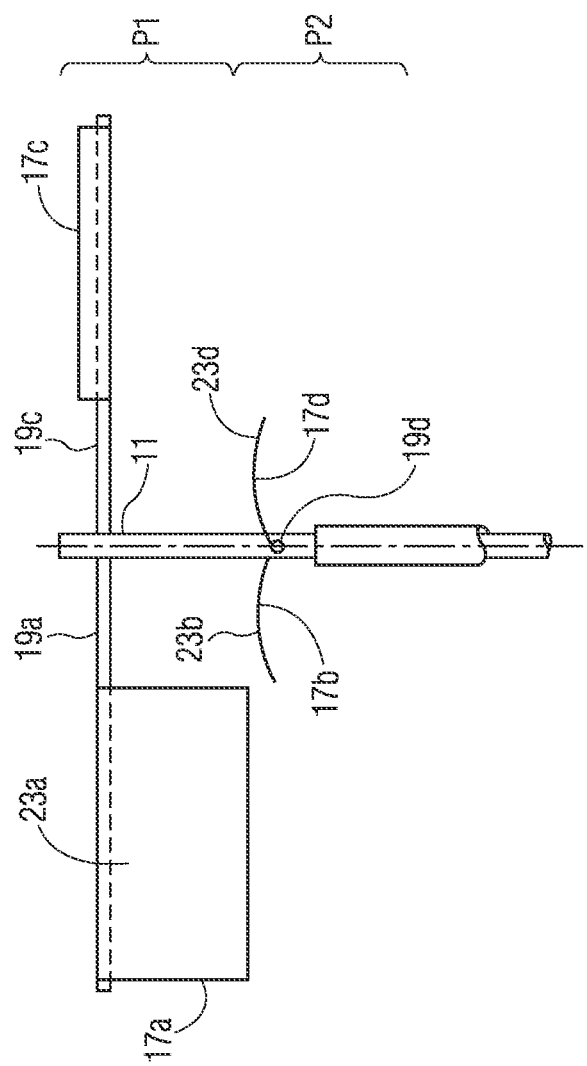
FIG. 3 shows a side elevation view of an exemplary vertical-axis windmill.

Turning to FIGS. 2 and 3, a four-vane configuration of a vertical-axis windmill 10 is shown with resilient restraining arms and restraining lines omitted to simplify although it should be understood that those structures would be present in each vane assembly as depicted in FIG. 1. As seen in the plan view in FIG. 2, the exemplary four-vane vertical-axis windmill comprises a first vane assembly 17a, a second vane assembly 17b, a third vane assembly 17c and a fourth vane assembly 17d. As seen in FIG. 2, a circumferential angle between the first vane assembly 17a and the third vane assembly 17c is 180° and a circumferential angle between the second vane assembly 17b and the fourth vane assembly 17d is 180°. Preferably, each vane assembly 17 of the four-vane configuration is positioned 90° along the direction of rotation from the adjacent vane assemblies 17.

Turning to FIG. 3, as shown in side-elevation, the vertical-axis windmill 10 having a four-vane configuration may suitably be provided with the first vane assembly 17a and the third vane assembly 17c arranged together along a first plane P1 and the second vane assembly 17b and the fourth vane assembly 17d are arranged together along a second plane P2. Preferably, the first plane P1 and the second plane P2 do not overlap one another.

The movement of the vertical-axis windmill will now be described. Gravity biases the planar sail 23 toward to vertical orientation, whereas wind pressure on the leading surface of the planar sail 23 during rotation urges the planar sail 23 toward the horizontal position. During rotation, the planar sail 23 assumes the vertical position during less than one half of a rotation of the rotating vertical shaft 11 as the radial spar 19 carrying the planar sail 23 retreats before the wind. Typically, the planar sail 23 may be in the vertical position for roughly one third of a revolution, or 120°, with that arc centered roughly on a plane perpendicular to the wind direction.

As the radial spar 19 supporting the planar sail 23 just begins to retreat from the oncoming wind, gravity and the velocity-induced pressure on the up-wind side of the planar sail 23 causes the planar sail 23 to "snap" quickly from its "trailing" horizontal orientation "behind" the radial spar 19 to its vertical orientation substantially below the radial spar 19. The planar sail 23 is held tightly in the vertical orientation and the trailing end 27 of the planar sail 23 is restrained from extending forward of the radial spar 19 by at least one, preferably two, restraining lines 29 connecting the trailing edge 27 of the planar sail 23 to a distal end 31 of the resilient restraining arm 21.

Subjecting a planar sail 23 to a load from wind pressure drives rotational movement of the vertical windmill 10 until the corresponding radial spar 19 is almost fully downstream from the rotating vertical shaft 11. At that point, the movement of the radial spar 19 across the wind flowpath (i.e., perpendicular to the wind flowpath) begins to create more dynamic air pressure on the leading face of the planar sail 23 than the low-angle windstream can produce on the trailing face of the planar sail 23. This differential pressure quickly lifts the planar sail 23 back to the horizontal orientation trailing behind the corresponding radial spar 19.

The planar sail 23 is retained in the horizontal orientation by the restraining lines 29. The restraining lines 29 are able to provide this "dual-position" restraint (horizontal and vertical) of the planar sail's 23 trailing edge 27 due to the location of the fixed-end point A of the restraining lines 29 at the distal end 31 of the restraining arm 21.

By oscillating as described above, each planar sail 23 on the vertical-axis windmill 10 provides maximum area, drag, and torque to the vertical rotating shaft 11 during the portion of each revolution when retreating from the oncoming wind; and minimum area, drag and parasitic torque (i.e., retarding torque to the vertical rotating shaft) during the portion of each revolution when "crossing" the wind flowpath (twice per revolution) or advancing into the wind flowpath (once per revolution). Another significant advantage of the vertical-axis windmill 10 is the way in which the planar sail 23 that is retreating before the wind (and driving rotation of the windmill) "picks up" the load produced by the wind as it "snaps" into the vertical orientation at the start of the driving portion of each revolution of the rotating vertical shaft 11 (i.e., just as the planar sail begins to retreat before the wind).

The oscillatory movement of the planar sail 23 between the vertical orientation and the horizontal orientation while wind drives the vane assembly 17 in the direction of rotation 15 can be seen best in FIGS. 2 and 3. In FIGS. 2 and 3, the planar sail 23a of the first vane assembly 17a is perpendicular to the wind flowpath (indicated by the arrow) and is positioned in the vertical orientation. The wind impinges upon the trailing face of the first vane assembly 17a and applies a load to the planar sail 23a. Conversely, at this time, the second vane assembly 17b, third vane assembly 17c and fourth vane assembly 17d respectively positioned at 90°, 180° and 270° are "unloaded" and positioned in the horizontal orientation with the planar sails 23b, 23c, 23d trailing behind the corresponding radial spar 19b, 19c, 19d as the vertical-axis windmill rotates.

The force of the wind impinging on the trailing face of the planar sail 23a drives the first vane assembly 17a along the direction of rotation 15 toward the 90° position downstream of the vertical shaft 11 (a position occupied by the second vane assembly 17b in FIGS. 2 and 3). As a result, the first vane assembly 17a crosses the wind flowpath and differential air pressure causes the planar sail 23a to oscillate toward the horizontal position. Additionally, since the vane assemblies 17 rotate in unison, at the same time that the first vane assembly 17a retreats from the wind flowpath and moves toward the 90° position downstream of the vertical shaft 11, the fourth vane assembly 17d moves from the 270° position upstream of the vertical shaft 11 into the 0° position perpendicular to the wind flowpath. As the fourth vane assembly 17*d* crosses the wind flowpath, the trailing face of the planar sail 23*d* is exposed to the force of the wind, which causes the planar sail 23*d* to oscillate from the horizontal position to the vertical position. Upon assuming the vertical orientation, the planar sail 23*d* is subjected to a load from the wind and is responsible for driving the further rotation of the vertical-axis windmill 10.

Further rotation of the vertical-axis windmill 10 drives the vane assembly 17 positioned at the 90° position downstream of the vertical shaft 11 to the 180° position advancing into the wind (a position occupied by the third vane assembly 17*c* in FIGS. 2 and 3). As shown with the third vane assembly 17*c* in FIGS. 2 and 3, the planar sail 23*c* at the 180° position advancing into the wind flowpath assumes the horizontal orientation trailing behind the radial spar 19, which reduces drag and parasitic torque. Likewise, rotation of the vertical-axis windmill 10 drives the vane assembly 17 advancing into the wind at position 180° toward the 270° position upstream of the vertical shaft 11 (a position occupied by the fourth vane assembly 17*d* in FIGS. 2 and 3) and, in doing so, the vane assembly 17 crosses the wind flowpath. As shown in FIGS. 2 and 3, the vane assembly 17 upstream of the vertical shaft 11 at position 270° retains the horizontal orientation until continued rotation exposes the planar sail 23 to the force of the wind, which causes the planar sail 23 to oscillate from the horizontal position to the vertical position to drive further rotation.

While the present disclosure has been described in detail and shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents.

The invention claimed is:

1. A vertical-axis windmill comprising:
   a rotating vertical shaft rotatable around a vertical axis in a direction of rotation; and
   at least one vane assembly mounted to the rotating vertical shaft;
   each vane assembly comprising:
      a radial spar extending radially from the rotating vertical shaft,
      a planar sail having a leading edge affixed to the radial spar and a trailing edge opposing the leading edge,
      a resilient restraining arm extending radially from the rotating vertical shaft; and
      at least one restraining line connecting the trailing edge of the planar sail to a distal end of the resilient restraining arm;
      wherein the planar sail is configured to oscillate between a vertical orientation in which the trailing edge the planar sail is positioned substantially below the radial spar and a horizontal orientation in which the trailing edge of the planar sail trails behind the radial spar in the direction of rotation.

2. The vertical-axis windmill of claim 1, wherein the planar sail assumes the vertical orientation when the planar sail retreats from a wind flowpath.

3. The vertical-axis windmill of claim 1, wherein the planar sail assumes the horizontal when the planar sail advances into a wind flowpath.

4. The vertical-axis windmill of claim 1, wherein the vertical-axis windmill self-starts rotational movement when subjected to a load from wind pressure.

5. The vertical-axis windmill of claim 1, wherein the windmill comprises a first vane assembly, a second vane assembly, a third vane assembly and a fourth vane assembly.

6. The vertical-axis windmill of claim 5, wherein the first vane assembly and the third vane assembly are arranged together along a first plane and the second vane assembly and the fourth vane assembly are arranged together along a second plane.

7. The vertical-axis windmill of claim 6, wherein the first plane and the second plane are not overlapping.

8. The vertical-axis windmill of claim 5, wherein a circumferential angle between the first vane assembly and the third vane assembly is 180° and a circumferential angle between the second vane assembly and the fourth vane assembly is 180°.

9. The vertical-axis windmill of claim 1, wherein the windmill comprises at least two restraining lines, each respectively connecting an opposing end of the trailing edge of the planar sail to a distal end of the resilient restraining arm.

10. The vertical-axis windmill of claim 1, wherein the at least one restraining line restrains oscillatory movement of the trailing end of the planar sail forward of the radial spar relative to the direction of rotation when the planar sail is subjected to a load from wind pressure.

11. The vertical-axis windmill of claim 1, wherein the resilient restraining arm extends from the vertical shaft at an acute angle relative to the radial spar such that the resilient restraining arm trails the radial spar relative to the direction of rotation.

12. The vertical-axis windmill of claim 1, wherein the vane assembly further comprises a stiffening rib affixed to the trailing edge of the planar sail.

13. The vertical-axis windmill of claim 1, wherein the planar sail is composed of fabric.

14. The vertical-axis windmill of claim 1, wherein the planar sail is rectilinear.

15. A method of generating wind power comprising providing the vertical-axis windmill of claim 1 operationally connected to a generator and exposing the vertical-axis windmill to wind.

16. The method of claim 15, wherein the planar sail assumes the vertical orientation when the planar sail retreats from a wind flowpath.

17. The method of claim 15, wherein the planar sail assumes the horizontal when the planar sail advances into a wind flowpath.

18. The method of claim 15, wherein the vertical-axis windmill self-starts rotational movement when subjected to a load from wind pressure.

* * * * *